United States Patent [19]
Wild et al.

[11] 3,983,361
[45] Sept. 28, 1976

[54] ELECTRIC HEATING APPARATUS FOR HEATING CORROSIVE SOLUTIONS

[75] Inventors: Fred A. Wild, Arcadia; Joseph S. Romance, Woodland Hills; Carson T. Richert, Buena Park, all of Calif.

[73] Assignee: Radiant Technology Corporation, Cerritos, Calif.

[22] Filed: Mar. 20, 1975

[21] Appl. No.: 560,355

[52] U.S. Cl. .............................. 219/433; 23/259; 206/2; 219/315; 219/338; 219/354; 219/415; 219/523
[51] Int. Cl.² ...................... H05B 1/00; F24H 1/18
[58] Field of Search.... 219/521, 523, 535, 429–442, 219/464, 443, 200, 280, 281, 310, 311, 312, 314–316, 328, 331, 335, 336, 337, 338, 354, 385, 386, 415–419, 220; 23/259, 292; 215/6; 206/2

[56] References Cited
UNITED STATES PATENTS

| 952,941 | 3/1910 | Perkins | 219/220 UX |
|---|---|---|---|
| 1,122,830 | 12/1914 | Wiese | 219/312 X |
| 1,694,570 | 12/1928 | Watts | 219/433 |
| 1,719,498 | 7/1929 | Bernard | 219/312 X |
| 2,158,681 | 5/1939 | Schulte | 219/315 X |
| 2,177,101 | 10/1939 | Franzwa | 219/552 X |
| 2,231,506 | 2/1941 | Morey | 219/535 |
| 2,424,161 | 7/1947 | Gunther | 219/433 |
| 2,573,237 | 10/1951 | Wilcox | 219/433 |
| 2,789,768 | 4/1957 | Kennedy | 219/331 UX |
| 3,417,230 | 12/1968 | Millikan | 219/464 X |

*Primary Examiner*—A. Bartis

[57] ABSTRACT

A pyrex tank for heating corrosive solutions is formed with a main body portion having an open top and with a small annular cavity portion depending from the bottom of the main body portion. A heater unit comprising a heating element enclosed in a quartz tube is securely mounted in an upright position on a support. The tank is positioned on the support with the central opening of its annular cavity receiving the quartz tube of the heating element. The solution in the main body portion of the tank is heated in the annular cavity portion thereof by convection. A thermocouple supported in an upright position on the support is inserted through the open lower end of an upright tube fixed to the bottom wall of the tank and extending upwardly into the interior thereof.

4 Claims, 4 Drawing Figures

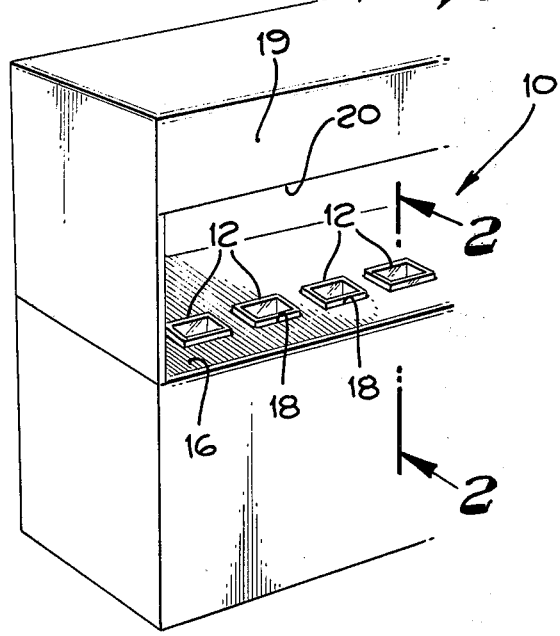
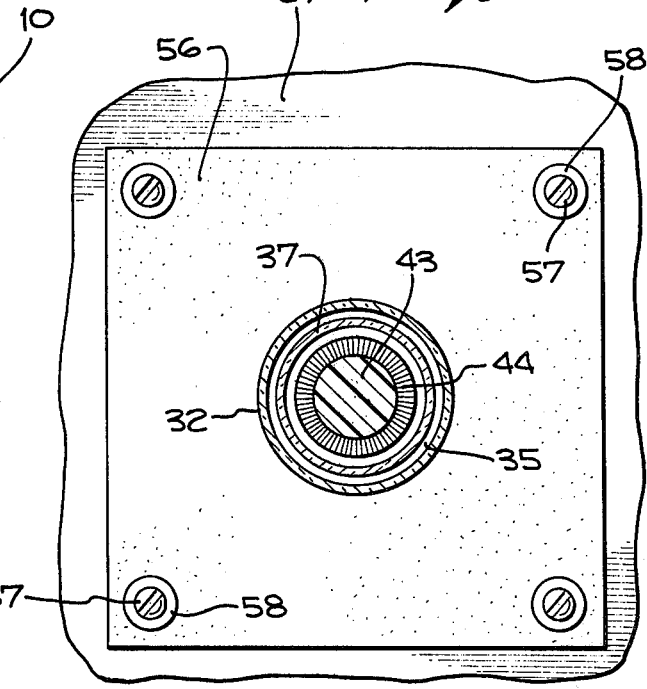
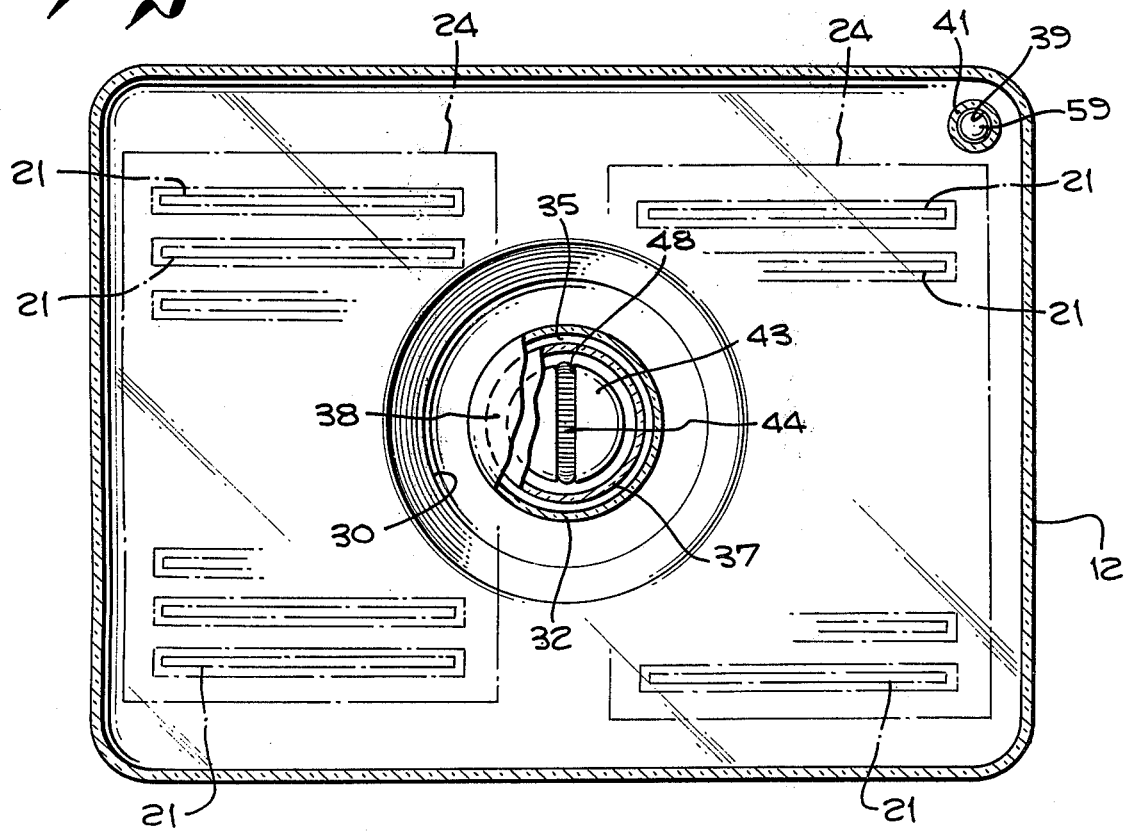

ELECTRIC HEATING APPARATUS FOR HEATING CORROSIVE SOLUTIONS

This invention relates to apparatus for heating solutions and more particularly to a novel combination of a tank and a heater unit for heating a corrosive solution.

The heating of corrosive solutions, as needed for etching semi-conductor wafers used in the digital computer industry, for example, is commonly carried out by placing a relatively small, open, Pyrex tank filled with the solution on a hot plate. The hot plate is usually formed by an arrangement of electric heating coils under a metal plate. The disadvantage of this approach is that hot spots tend to be formed on the bottom of the Pyrex tank producing strains in the wall thereof that could cause the tank to break. Furthermore, when articles being etched are taken out of the tank, if the corrosive solution accidentially drips on the hot plate, it will cause the metallic surface thereof to corrode.

Another and more efficient approach which is generally used for heating corrosive solutions in larger size tanks is to utilize a heater unit comprising a heating element enclosed in a quartz tube. The heater unit is hung on the side of the tank so as to be immersed in the solution. The disadvantage of using such an immersion heater unit in a small size Pyrex tank as needed for etching purposes is that it takes up too much space in the tank. Furthermore, the electrical contact on the upper end of the heater unit must be specially protected from the fumes of the solution in the tank. Moreover, if the level of the solution in the tank happens to fall, the heater unit may overheat causing damage to the equipment.

Accordingly, one of the objects of the present invention is to form a tank which enables a solution therein to be heated by a heater unit of the immersion type but which does not require that the heater unit be immersed in the solution.

Another object of the present invention is to provide a tank with a small depending annular cavity portion on the bottom thereof which facilitates the positioning of the tank on a fixed upright heater unit installation for the purpose of heating the solution in the tank.

Another object of the invention is to form a tank with a main body portion having a depending, elongated, annular cavity portion which can be positioned over an upwardly installed tubular heater unit whereby the solution in the main body portion of the tank can be heated in the annular cavity portion by convection.

With these and other objects in view the invention consists in the construction, arrangement, and combination of various parts of the device whereby the objects contemplated are obtained as hereinafter set forth, pointed out in the appended claims and illustrated in the accompanying drawings.

Referring to the drawings:

FIG. 1 shows an overall view of a work bench adapted to receive the tanks of the present invention;

FIG. 3 is a horizontal sectional view of the tank as taken along line 3—3 of FIG. 2; and FIG. 4 is a sectional view as taken along line 4—4 of FIG. 2.

Figure 2:
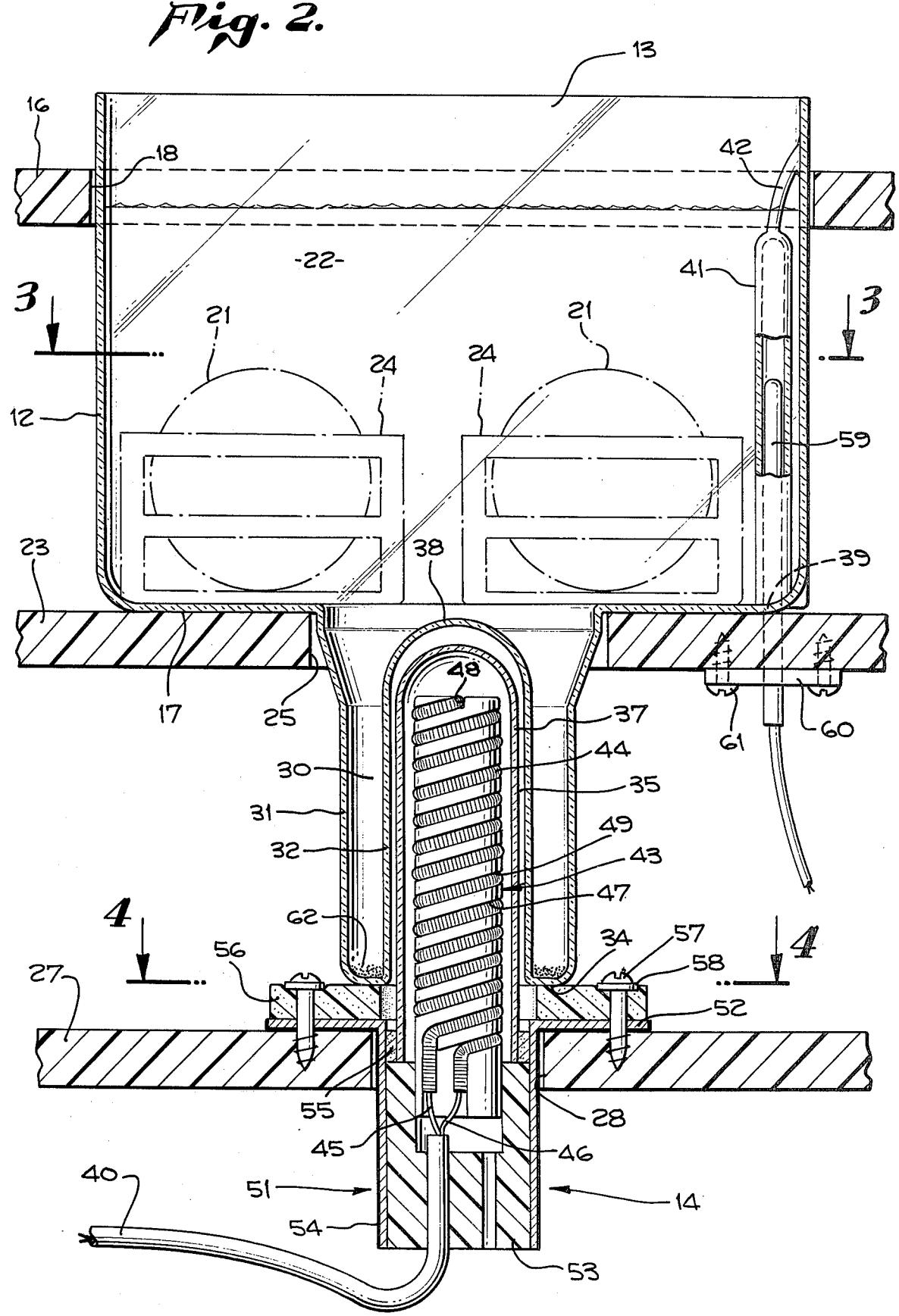
FIG. 2 is a vertical sectional view as taken along line 2—2 of FIG. 1 showing a tank positioned on a heater unit securely installed below the top of the work bench.

Referring to the drawings, a work bench 10 is shown in FIG. 1 which embodies the solution heating apparatus of the present invention. The work bench 10 includes a table top 16 having a hood 19 positioned thereover. The front of the hood is provided with an opening 20 to provide access to tanks 12 positioned in wells 18 formed in a row along the table top 16. The tanks 12 are filled with a corrosive solution such as sulfuric or phosphoric acid which after being heated is used to etch semiconductor wafers 21 as used for integrated circuits, for example. Baskets 24 made of teflon are used to place the wafers in the tank.

Reference is now made to FIG. 2 which is a cross-section taken through one of the wells 18 of the work bench 10 including the enclosed area below the table top 16. Thus, as shown, the table top 16 is preferably formed of a sheet of plastic with the rectangularly shaped wells 18 cut therethrough. Spaced below the table top 16 is a first shelf 23 having a circular opening 25 centered below the well 18. Spaced below the first shelf 23 is a second shelf 27 having a circular opening 28 which is on the same center as the circular opening 25 of the first shelf 23 but smaller in diameter. The first and second shelves 23 and 27 are preferably formed of sheets of plastic. Each of the other wells 18 on the table top 16 is similarly provided with a circular opening 25 on the first shelf and a circular opening 28 on the second shelf.

The shape of the Pyrex tank 12 can best be seen in FIGS. 2 and 3. Thus the main body portion 22 of tank 12 is rectangular in shape with an open top 13. Centrally depending from the bottom 17 of the tank 12 is an elongated, relatively small diameter, annular cavity portion 30 formed from an outer circular wall 31 and a smaller diameter inner circular wall 32. The lower end of the annular cavity portion 30 is closed off by a bottom wall 34 and the top end of the central opening 35 formed by the inner circular wall 32 is closed off just below the level of the bottom 17 of the main body portion 22 of the tank 12 by a concave upper wall 38. Positioned such as to project upwardly from an opening 39 in the corner of the rectangular shaped tank 12 is a Pyrex tubing 41. The upper end of the tubing 41 is closed off and connected to the side of the Pyrex tank 12 by a short Pyrex rod 42.

The heater unit 14 comprises an elongated ceramic core 43 formed with a first helical groove 47 which extends from the bottom to the top of the core 43, and a second helical groove 49 which runs parallel to the first helical groove 47, and extends from the top of the core 43. A straight portion of wire 45 extends up from an insulated conductor 40 and forms the heating coil 44 which fits into and follows the first helical groove 47 to the top of the core 43, crosses over a diametric groove 48 on the top thereof, and then fits into and follows the second helical groove 49 back down to the bottom of the core 43. The end of the heating coil 44 then terminates in a straight portion of wire 46 which forms the other wire of the insulated conductor 40.

A metal cylindrical housing 51 having a square shaped metal flange 52 on the upper end thereof forms the base of heater unit 14. A square shaped acid resistant insulating cushion 56 is held by an adhesive on the upper surface of the flange 52. The exposed outer surfaces of the walls and flange of housing 51 are covered with a corrosive resistant paint 54. The lower end of the ceramic core 43 with the insulated conductor 40 depending therefrom is positioned in the cylindrical housing 51. An epoxy potting compound 53 is then poured into the bottom end of the cylindrical housing 51 which when hardened concentrically fixes the core 53 in position therein. A quartz tube 37 is then fitted over the ceramic core 43 with its bottom and extending into the cylindrical housing 51 and sealed in position by a clear silicone compound 55.

The heater unit 14 is installed in the lower portion of the work bench 10 directly below a well 18 on the table top 16 with its metal cylindrical housing 51 extending down into the circular opening 28 provided on the shelf 27 and with its square shaped flange 52 resting on the surface of the plastic shelf 27. Teflon screws 57 having teflon washers 58 beneath the head thereof pass through the insulating cushion 56 and engage the second shelf 27. The heater unit 14 is thus securely installed in position in the bottom area of the work bench 10. It should be noted that when so installed the top of the quartz tube 37 extends just slightly above the lower surface of the first shelf 23.

It should now be clearly understood that the heater unit is permanently secured on its shelf 27 directly below one of the wells 18 in the table top 16 of the work bench 10. Thus, when a tank 12 is lowered in the well 18, the central opening 35 in the depending annular cavity portion 30 thereof is positioned over the quartz tube 37 but spaced therefrom, while the bottom 17 of the main body portion 22 of the tank 12 seats on the shelf 23, and the bottom end 34 of the depending annular portion 30 rests on the insulating cushion 56.

It should be noted that a thermocouple 59 having a body formed of a copper tubing is securely installed by a bracket 60 in its base on the first shelf 23. Teflon screws 61 hold the bracket 60 on the first shelf 23 such that the thermocouple 59 is in an upright position. The termocouple 59 is so located on first shelf 23, relative to circular opening 25, that when the tank 12 is lowered down in the well 18 in the table top 16, the opening 39 on the corner thereof will receive the upright thermocouple 59 in the Pyrex tubing 41.

The action of the heater unit 14 on the solution in the tank 12 is in the form of a convection heater in that the solution in the annular cavity portion 30 surrounding the heater unit 14 moves upwardly as it is heated so as to be replaced by the cooler solution located in the rectangular shaped main body portion 22 of the tank 12. Such a heating action provides for heating the solution in the tank two to three times faster than when a tank with a flat bottom is placed on a hot plate. Because of the continual movement of the solution along the vertical walls of the annular cavity portion 30, as the solution therein is being heated and transferred upwardly, and replaced by cooler solution in the main body of the tank, hot spots are eliminated along the inner wall 32 assuring a long life for the tank 12.

It should be noted that during use of tank 12 as the semi-conductor wafers 21 in the teflon baskets 24 are etched by the solution in the tank, a sediment 62 forms. An advantage of the construction of the tank 12 of the present invention is that such sediment 62 tends to settle on the lowermost part of the tank 12 which in this case is the bottom end 34 of the annular cavity portion 30. Thus the introducing of teflon baskets 24 with wafers 21 into the tank and the removal thereof does not cause the sediment 62 to be stirred up in the solution such as to settle on the wafers 21.

Another advantage of the construction of the tank 12 of the present invention is that by providing for the heater unit 14 to extend up into the central opening 35 formed by the depending annular cavity portion 30 of the tank, the problem of overheating the equipment by a lowering of the level of the solution of the tank is overcome. This is due to the fact that in the tank of the present invention, there is always a solution present in the annular cavity portion 30 about the heater unit 14 as long as there is some solution remaining in the main body portion 22 of the tank 30. It should be particularly noted that the tanks 12 are freely held in position over the securely installed heater units 14. Thus after an etching process has been completed, the tanks can be readily lifted out of their wells 18 for the purpose of disposing of the old solution and cleaning the tank for the new solution as required for the next etching process.

While the description has been concerned with a particular illustration embodiment of the present invention it will be appreciated that many modifications and variations in the construction and arrangement thereof may be provided for without departing from the spirit and scope of the invention or sacrificing any of its advantages and the invention is therefore to be limited only as indicated by the scope of the appended claims.

What is claimed is:

1. Apparatus for heating solutions comprising:
    a tank having a main body portion with an open top and having on the botton thereof a relatively smaller depending elongated annular cavity portion with a central opening accessible from the bottom thereof, said tank having anchored adjacent the inside wall of the main body portion thereof an upright tube having a closed upper end and an open lower end connected to an opening in the bottom of the tank;
    a support means;
    a thermocouple fixedly supported in an upright position on said support means; and
    a heater unit including a heating coil enclosed in an elongated quartz tube fixedly supported in an upright position on said suport means;
    the central opening of the depending annular cavity portion of the tank and the upright tube in said tank each being of such a size and shape that said tank is removably supported on said support means with said central opening freely fitted over said quartz tube and with said upright tube slidably fitted over said thermocouple 2. The invention in accordance with claim 1 wherein the main body portion of said tank is rectangularly shaped.

3. Apparatus for heating solutions comprising:
    a tank having a main body portion with an open top and having on the bottom thereof a relatively smaller depending elongated annular cavity portion with a central opening accessible from the bottom thereof, said tank having anchored adjacent the inner side wall of the main body portion thereof an upright tube having a closed upper end and an open lower end connected to an opening in the bottom of the tank;
    a termocouple;
    a heater unit including a heating coil enclosed in an elongated quartz tube and a cylindrical base having a flange; and
    a support means including
    a table top provided with a well of such size and shape as to receive the main body portion of the tank;
    a first shelf space below said table top and provided with an opening of such size and shape as to receive the depending portion of the tank, said first shelf having said thermocouple fixedly supported in an upright position thereon;

a second shelf spaced below said first shelf and provided with an opening aligned with said opening on said first shelf, said base of said heater unit being disposed in the opening of said second shelf with its flange secured to the surface thereof; and a cushion on the upper surface of said flange;

said tank being insertable down into the well of said table top with the central opening of its annular cavity portion freely positioned over the quartz tube of the heater unit, with its upright tube freely positioned over the thermocouple, and with the bottom of its main body portion supported on said first shelf and the bottom of its annular cavity portion resting on said cushion.

4. Apparatus for heating solutions comprising:

a tank having a main body portion with an open top and having on the bottom thereof a relatively smaller depending elongated annular cavity portion with an upright central opening accessible from the bottom thereof;

an upright heating unit including a heating coil and having a cylindrical base with a flange; and a support means including a table top provided with a well of such size and shape as to receive the main body portion of the tank;

a first shelf spaced below said table top and provided with an opening of such size and shape as to receive the depending portion of the tank; and a second shelf spaced below said first shelf and provided with an opening aligned with said opening on said first shelf, the base of said heater unit being disposed in the opening of said second shelf with its flange secured to the surface thereof;

said tank being insertable in the well of said table top with its depending portion disposed in the opening of said first shelf and the upright central opening of its annular cavity portion positioned over the upright heater unit, and with the bottom of its main body portion supported on said first shelf.

* * * * *